(12) United States Patent
Kohlmann et al.

(10) Patent No.: US 11,007,808 B2
(45) Date of Patent: May 18, 2021

(54) METAMERIC SECURITY DEVICES

(71) Applicant: VIAVI SOLUTIONS INC., San Jose, CA (US)

(72) Inventors: Paul Thomas Kohlmann, Windsor, CA (US); Cornelis Jan Delst, Fairfax, VA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 9 days.

(21) Appl. No.: 16/253,036

(22) Filed: Jan. 21, 2019

(65) Prior Publication Data
US 2019/0225006 A1 Jul. 25, 2019

Related U.S. Application Data

(60) Provisional application No. 62/620,294, filed on Jan. 22, 2018.

(51) Int. Cl.
| | |
|---|---|
| *B42D 25/378* | (2014.01) |
| *B42D 25/369* | (2014.01) |
| *B42D 25/405* | (2014.01) |
| *G01J 3/46* | (2006.01) |
| *C09C 1/00* | (2006.01) |
| *G02B 5/28* | (2006.01) |
| *B42D 25/36* | (2014.01) |
| *G07D 7/202* | (2016.01) |
| *G07D 7/00* | (2016.01) |
| *G07D 7/12* | (2016.01) |

(Continued)

(52) U.S. Cl.
CPC ........... *B42D 25/378* (2014.10); *B42D 25/36* (2014.10); *B42D 25/369* (2014.10); *B42D 25/405* (2014.10); *C09C 1/003* (2013.01); *C09C 1/0057* (2013.01); *G01J 3/465* (2013.01); *G02B 5/285* (2013.01); *G07D 7/00* (2013.01); *G07D 7/12* (2013.01); *G07D 7/205* (2013.01); *B42D 25/29* (2014.10); *B42D 25/373* (2014.10); *C09C 2200/24* (2013.01)

(58) Field of Classification Search
CPC .......... G07D 7/00; G07D 7/12; G07D 7/1205; G07D 7/205; G01J 3/465; B42D 25/29; B42D 25/36; B42D 25/369; B42D 25/373; B42D 25/378; B42D 25/405
See application file for complete search history.

(56) References Cited

U.S. PATENT DOCUMENTS

| | | | |
|---|---|---|---|
| 5,766,738 A | 6/1998 | Phillips et al. | |
| 2015/0138641 A1 | 5/2015 | Delst et al. | |
| 2019/0314857 A1* | 10/2019 | Nikseresht Ghanepour | ................ B05D 3/207 |

FOREIGN PATENT DOCUMENTS

| | | |
|---|---|---|
| EP | 2873994 | 5/2015 |
| JP | 2006231608 | 9/2006 |
| KR | 10-0441995 B1 | 9/2004 |

(Continued)

*Primary Examiner* — Hina F Ayub
*Assistant Examiner* — Amanda Merlino
(74) *Attorney, Agent, or Firm* — Mannava & Kang, P.C.

(57) ABSTRACT

There is disclosed a security device, including a substrate; a first color-shifting pigment on a first region of the substrate; and a second pigment, including at least three dielectric layers, on a second region of the substrate; wherein the first color-shifting pigment and the second pigment color match at a first viewing angle. Methods of making and using the security device are also disclosed.

19 Claims, 13 Drawing Sheets

(51) Int. Cl.
*B42D 25/29* (2014.01)
*B42D 25/373* (2014.01)

(56) References Cited

FOREIGN PATENT DOCUMENTS

| | | |
|---|---|---|
| WO | 03/053674 | 7/2003 |
| WO | 2016/005158 | 1/2016 |

* cited by examiner

METAMERIC SECURITY DEVICES

RELATED APPLICATION

This application claims priority to U.S. Provisional Application No. 62/620,294, filed Jan. 22, 2018, the disclosure of which is hereby incorporated by reference.

FIELD OF THE INVENTION

This application is directed to a security device including a pair of pigments that match in color at a first viewing angle and mismatch in color at a second viewing angle over a wide range of lighting conditions. The pair of pigments can be made through the use of dissimilar coating structures. A method of making a security device is also disclosed.

BACKGROUND OF THE INVENTION

A security device including two printed areas that match color at a predetermined viewing angle has been a goal. Previous attempts at achieving this goal used a pair of similar pigment designs with dissimilar dielectric materials (e.g., a 4 quarter wave $MgF_2$ shifter and a 4 quarter wave ZnS non-shifter), or the same pigment design and similar dielectric materials (e.g., a 2 quarter wave $MgF_2$ and a 4 quarter wave $MgF_2$ design) to produce color matches within a narrow range of lighting conditions or not at all. The efforts used a combination of a thinner dielectric layer interference pigment and a thicker dielectric layer interference pigment. The spectral results of these two pigments did not match well because the spacing and width of the reflection peaks and valleys in the reflection spectra of these pigments was different. The spectra are extremely dissimilar. A second effort used a combination of a low-index dielectric layer interference pigment and a high-index dielectric layer interference pigment. The spectral results of these two pigments did not match well because the spacing and width of the reflection peaks and valleys in the reflection spectra of the high-index dielectric layer interference pigment was different than the low-index dielectric layer interference pigment. This resulted in a better color match under a certain lighting condition, but still a failure to color match under many other lighting conditions.

For example, other pigment pairs achieved a match over a wide range of lighting conditions, but only if the pigments where low in chromaticity (e.g., a 2 quarter wave $MgF_2$ shifter and a 2 quarter wave ZnS non-shifter). The color performance was too low to be effective as a security device.

SUMMARY OF THE INVENTION

In an aspect, there is disclosed a security device, including a substrate; a first color-shifting pigment on a first region of the substrate; and a second pigment, including at least three dielectric layers, on a second region of the substrate; wherein the first color-shifting pigment and the second pigment color match at a first viewing angle.

In another aspect, there is disclosed a method of making a security device, including applying a first color-shifting pigment to a first region of a substrate; applying a second pigment to a second region, which is adjacent to the first region, of the substrate to form a security device.

Additional features and advantages of various embodiments will be set forth, in part, in the description that follows, and will, in part, be apparent from the description, or may be learned by the practice of various embodiments.

The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1A:
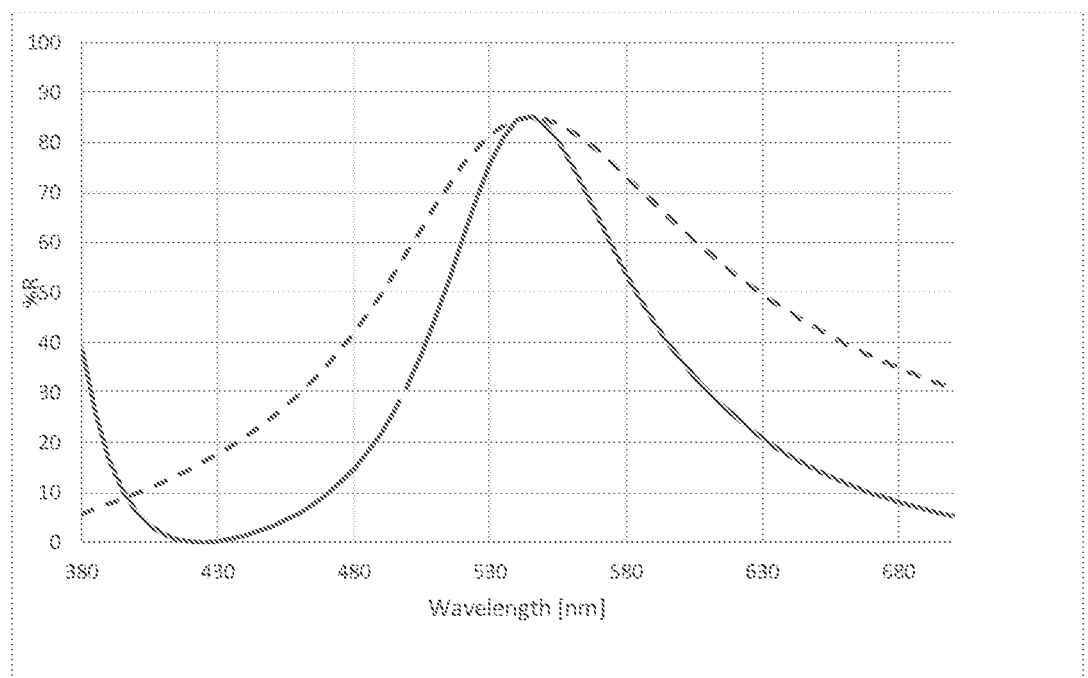
FIG. 1A is a graph of the spectral measurement showing reflectance of the security device under perfect white light of Comparative Example 1.
Figure 1B:
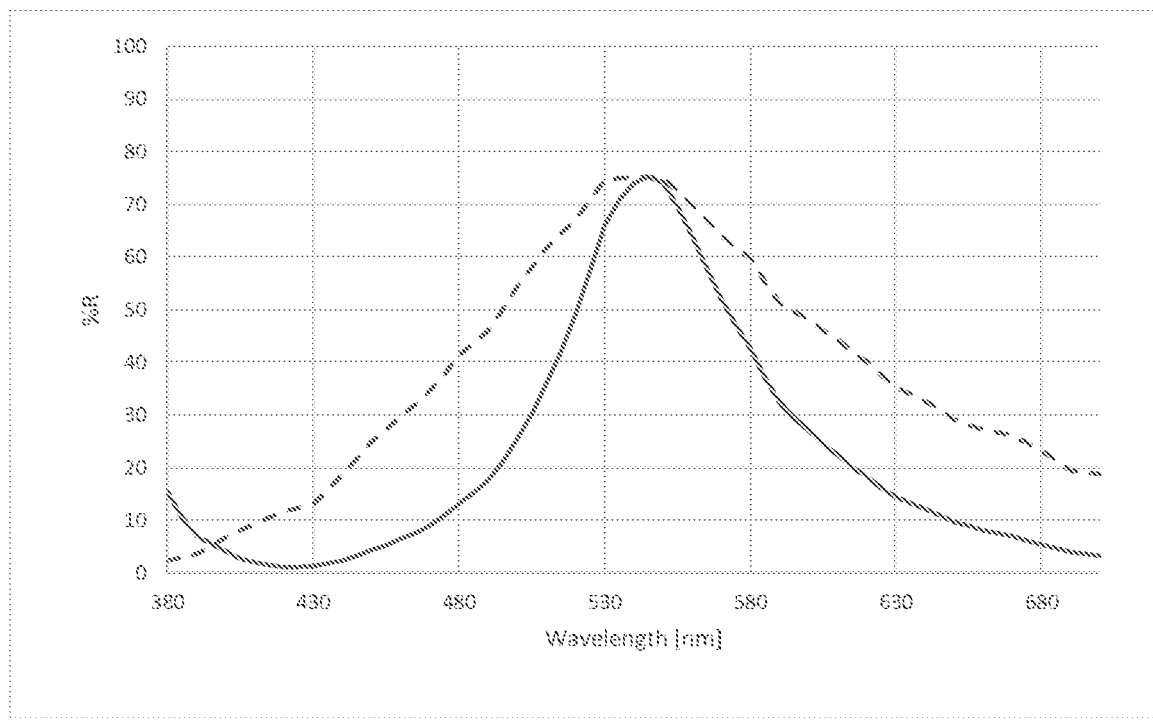
FIG. 1B is a graph of the spectral measurement showing reflectance of the security device under CIE-D65 (daylight) of Comparative Example 1.
Figure 1C:
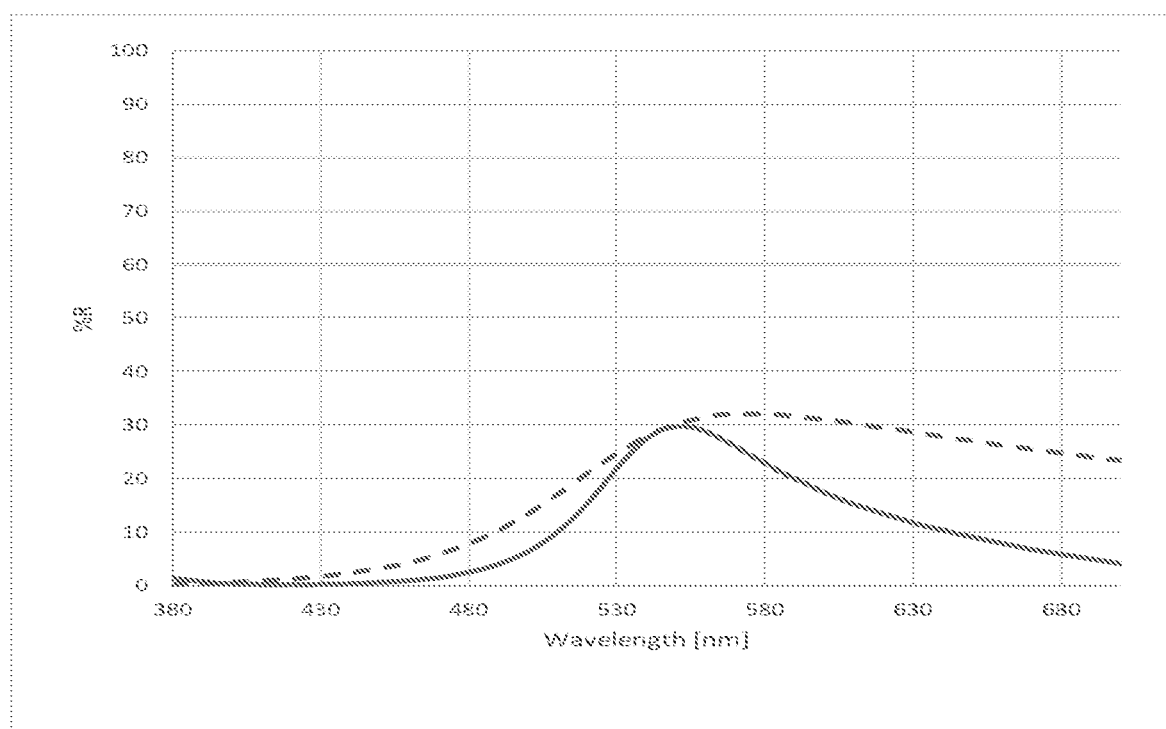
FIG. 1C is a graph of the spectral measurement showing reflectance of the security device under CIE-A (incandescent light) of Comparative Example 1.
Figure 1D:
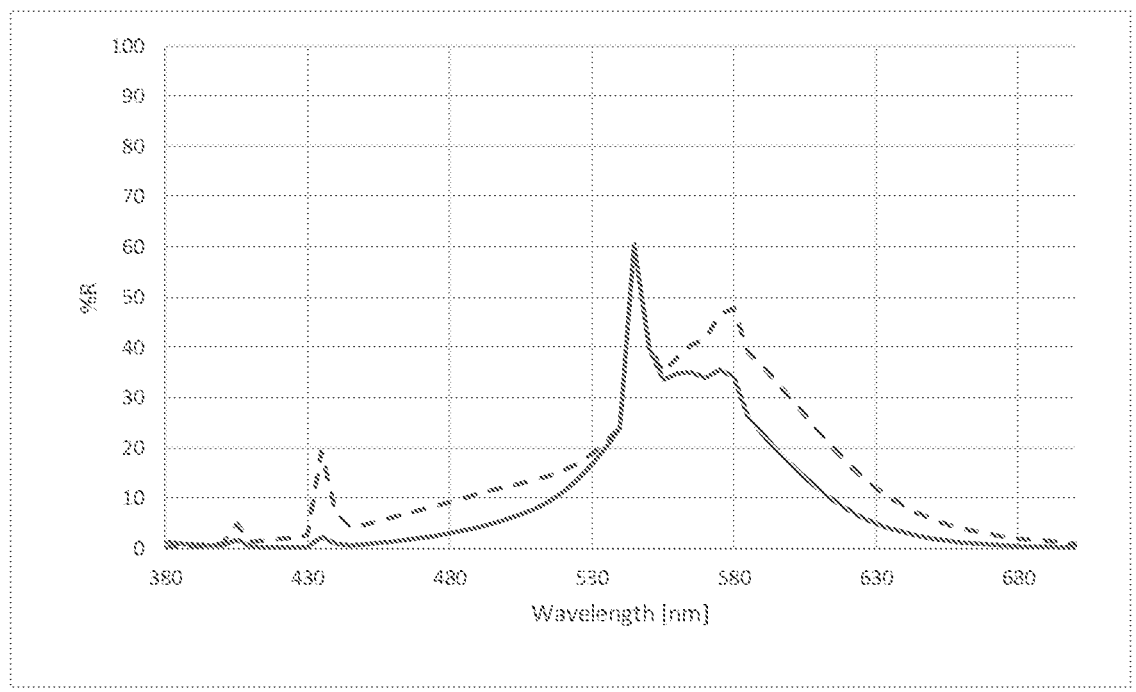
FIG. 1D is a graph of the spectral measurement showing reflectance of the security device under CIE-F2 (cool white fluorescent light) of Comparative Example 1.
Figure 2A:
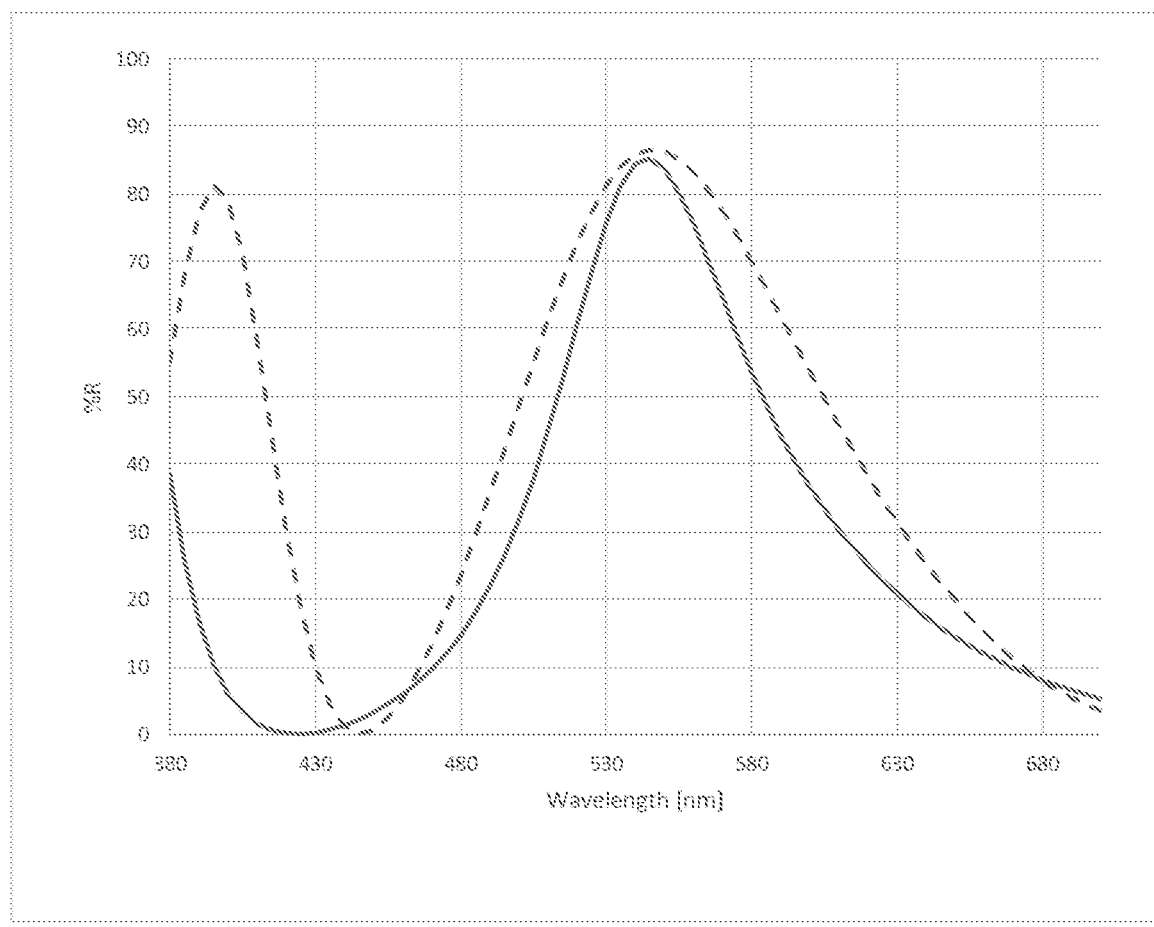
FIG. 2A is a graph of the spectral measurement showing reflectance of the security device under perfect white light of Comparative Example 2.
Figure 2B:
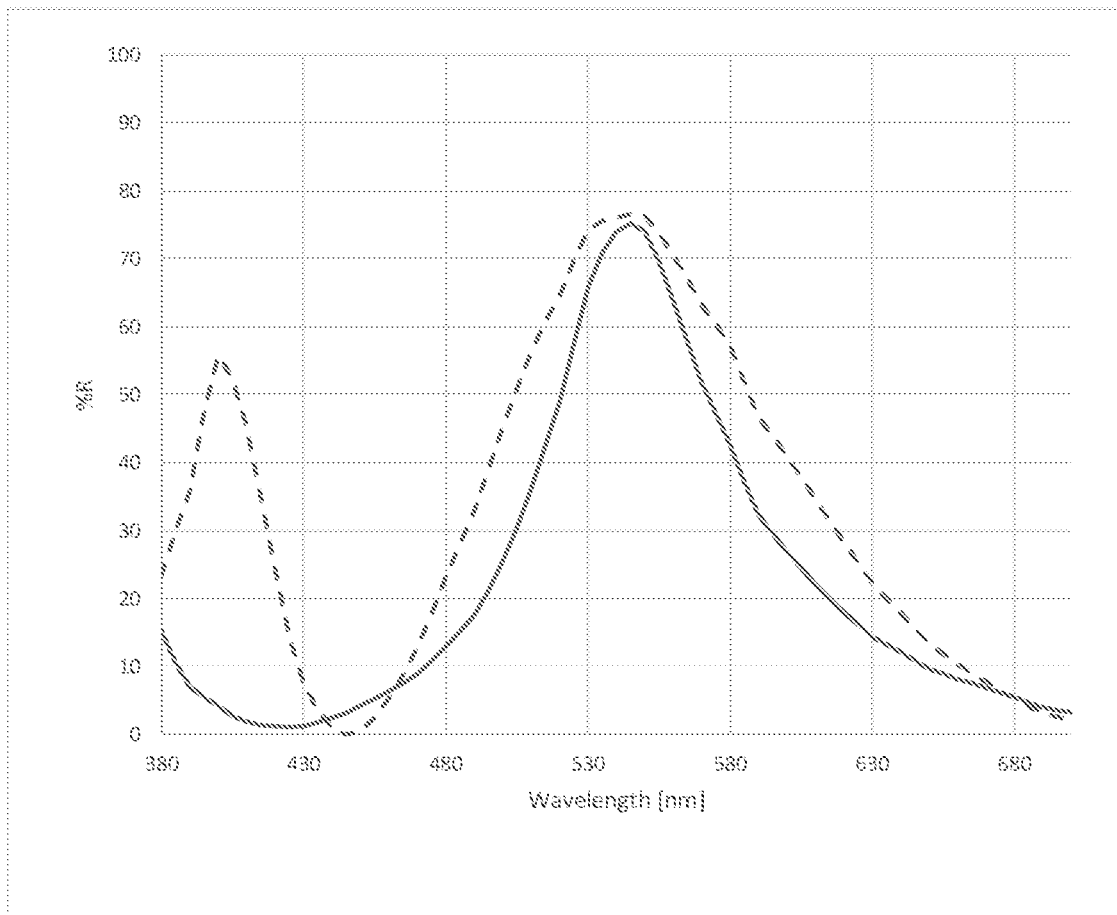
FIG. 2B is a graph of the spectral measurement showing reflectance of the security device under CIE-D65 (daylight) of Comparative Example 2.
Figure 2C:
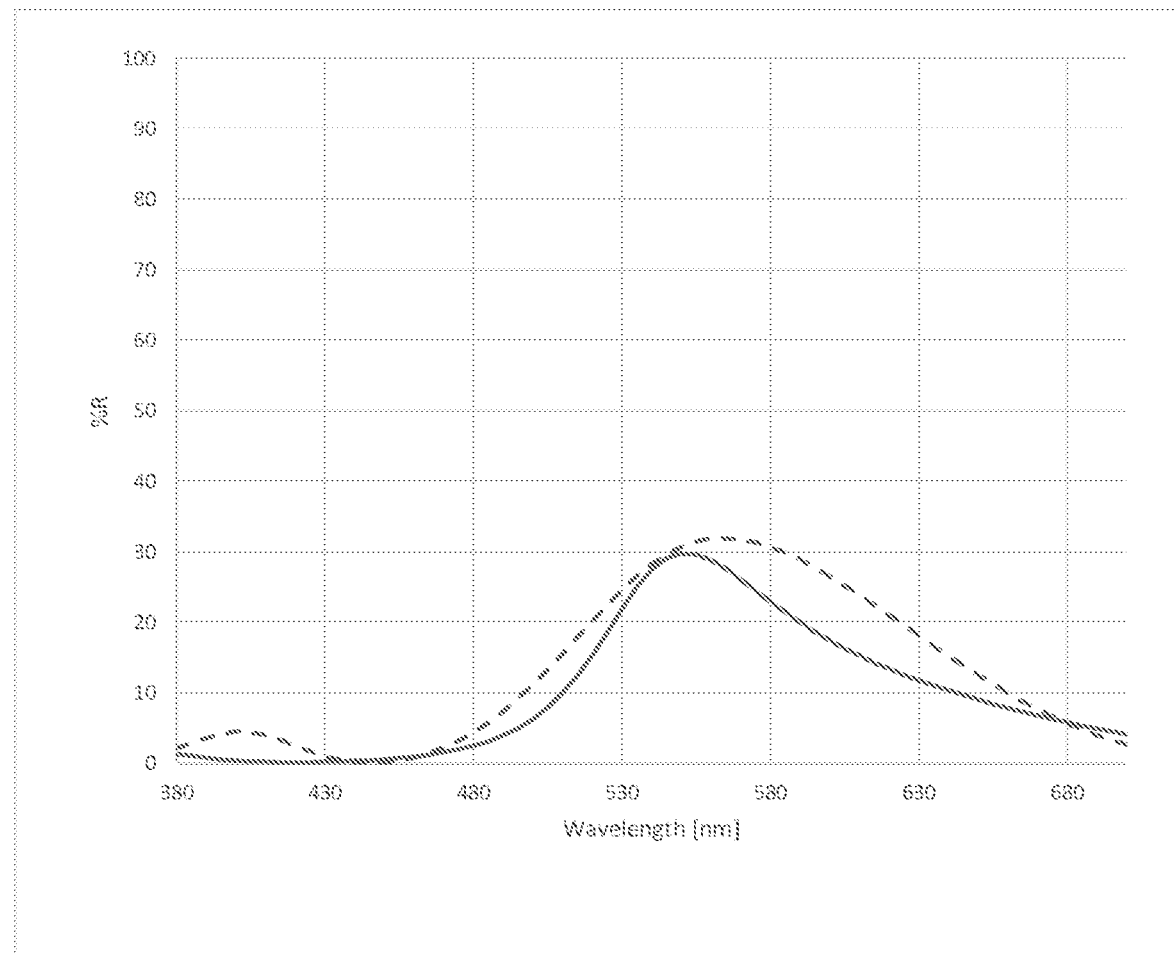
FIG. 2C is a graph of the spectral measurement showing reflectance of the security device under CIE-A (incandescent light) of Comparative Example 2.
Figure 2D:
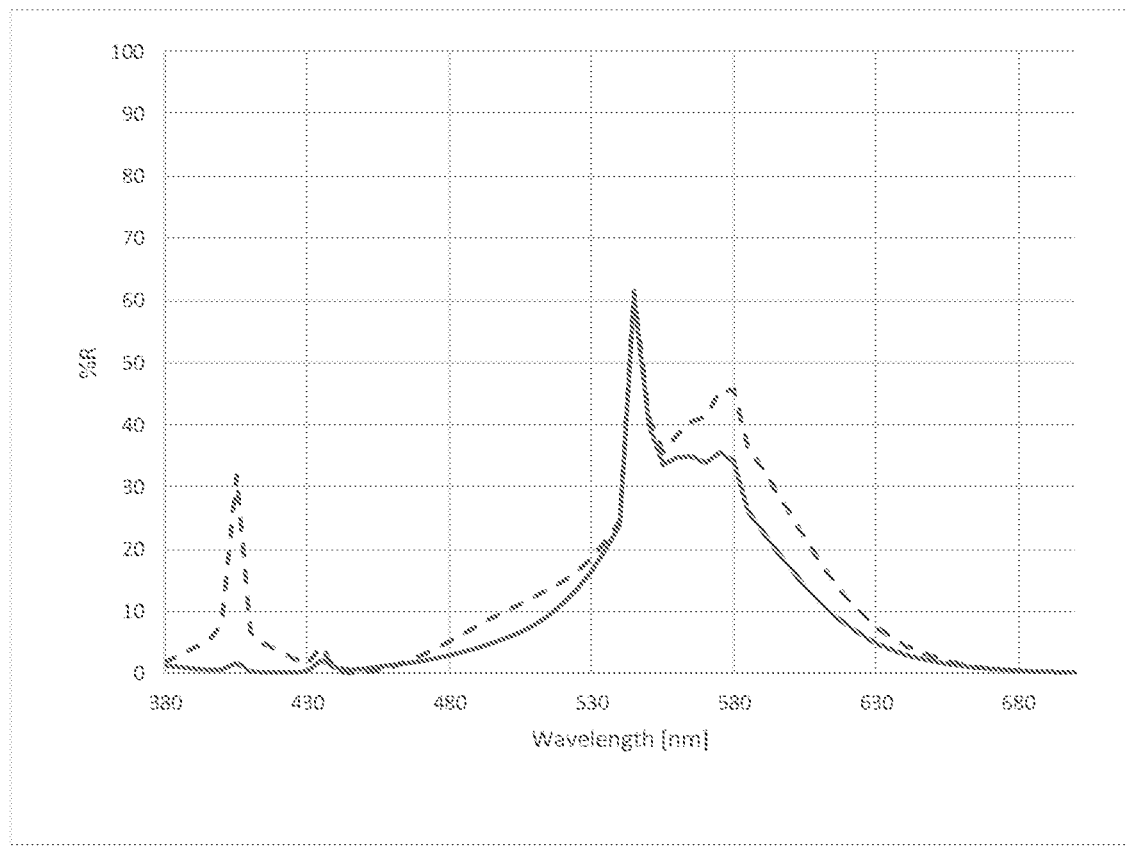
FIG. 2D is a graph of the spectral measurement showing reflectance of the security device under CIE-F2 (cool white fluorescent light) of Comparative Example 2.
Figure 3A:
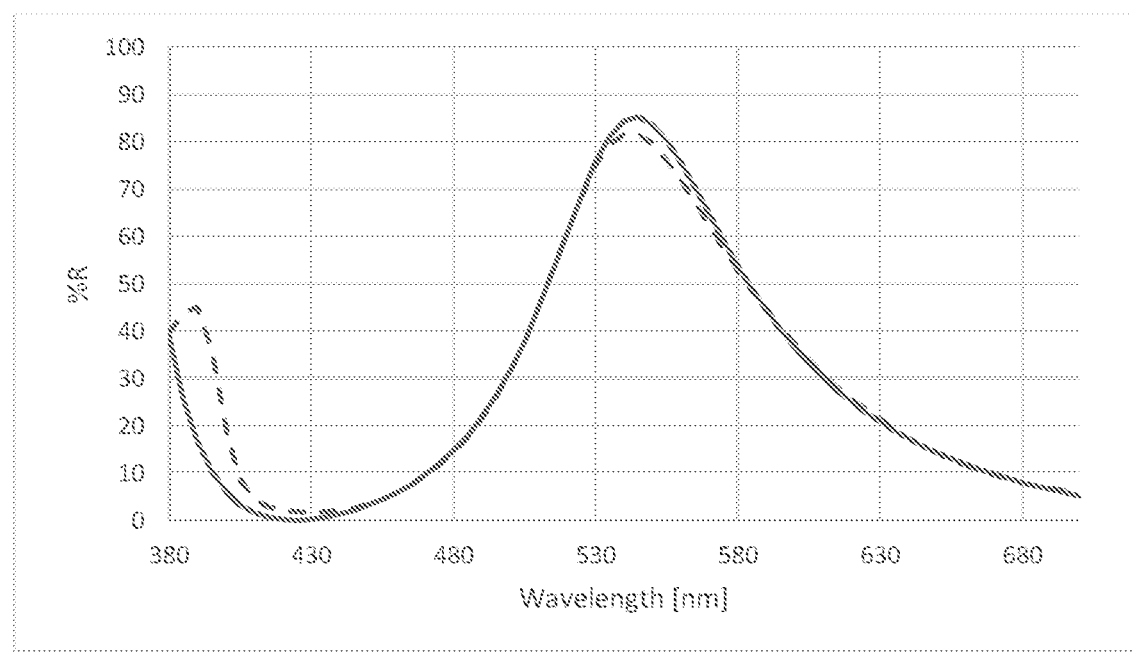
FIG. 3A is a graph of the spectral measurement showing reflectance of the security device under perfect white light of Example 1.
Figure 3B:
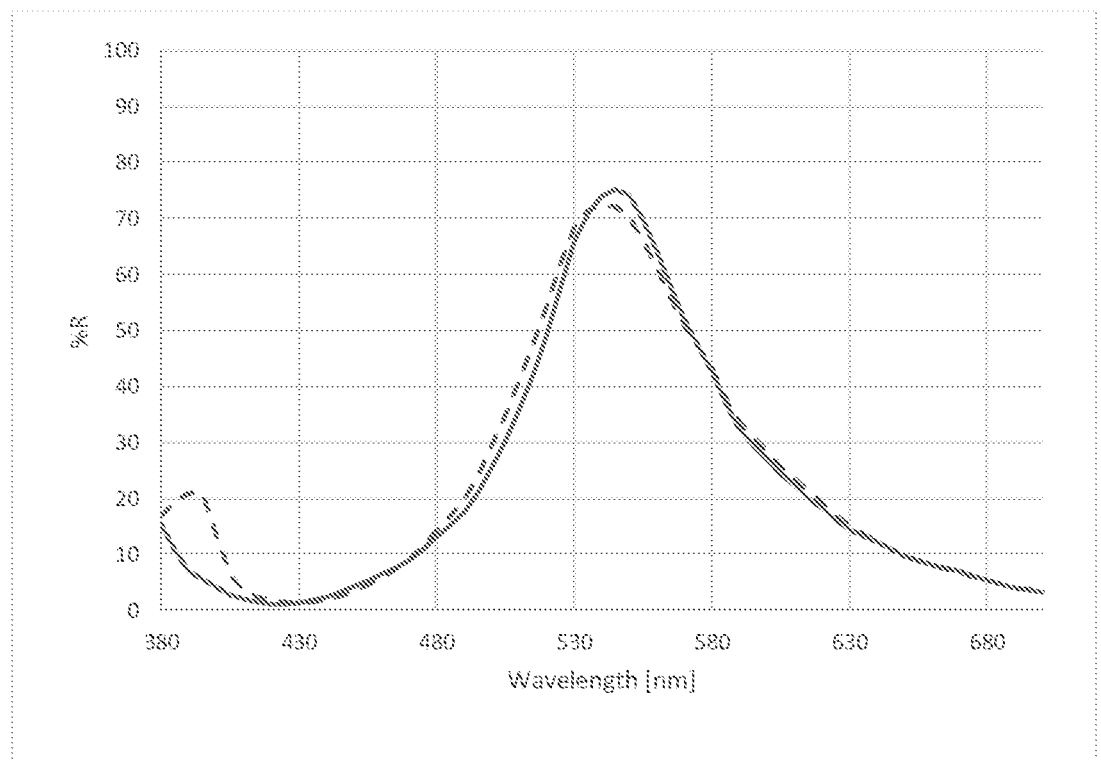
FIG. 3B is a graph of the spectral measurement showing reflectance of the security device under CIE-D65 (daylight) of Example 1.
Figure 3C:
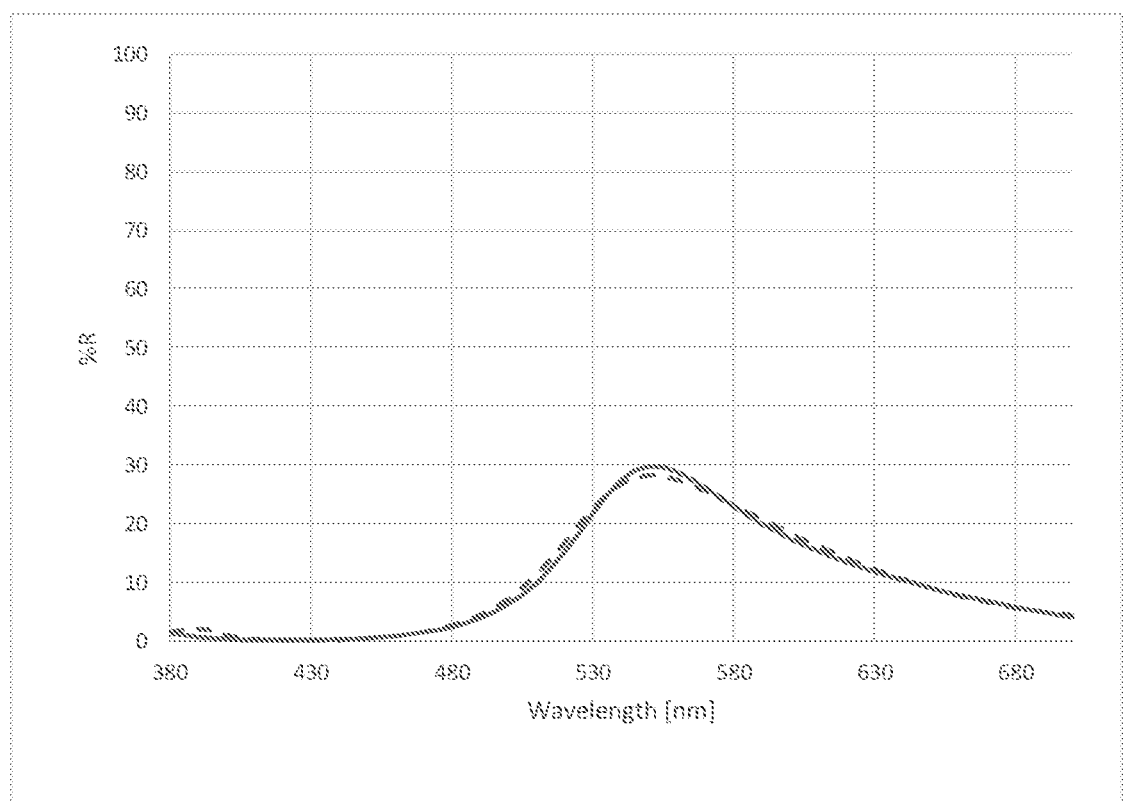
FIG. 3C is a graph of the spectral measurement showing reflectance of the security device under CIE-A (incandescent light) of Example 1.
Figure 3D:
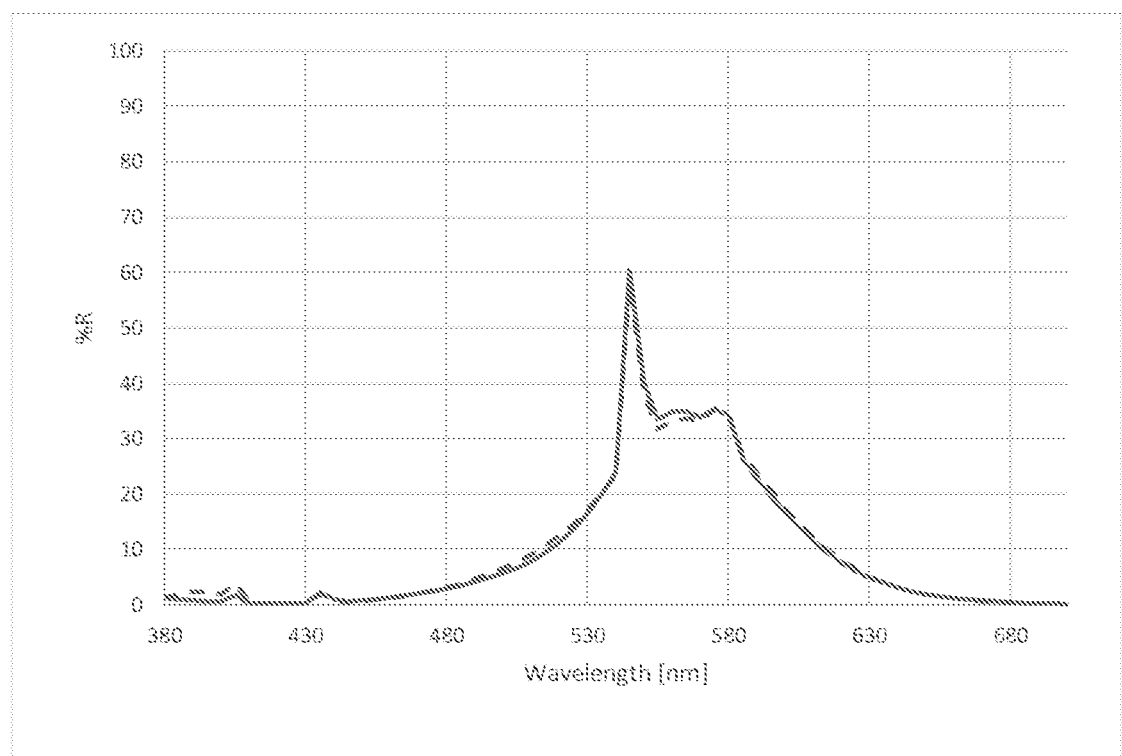
FIG. 3D is a graph of the spectral measurement showing reflectance of the security device under CIE-F2 (cool white fluorescent light) of Example 1.

It is to be understood that both the foregoing general description and the following detailed description are exemplary and explanatory only, and are intended to provide an explanation of various embodiments of the present teachings. The layers/components shown in each Figure may be described with regard to a particular Figure, but it is understood that the description of a particular layer/component would be applicable to the equivalent layer/component in the other Figures.

In its broad and varied embodiments, there is disclosed a security device including a substrate; a first color-shifting pigment on a first region of the substrate; a second pigment, including at least three dielectric layers, on a second region of the substrate; wherein the first color-shifting pigment and the second pigment color match at a first viewing angle; and wherein the first color-shifting pigment and the second pigment color mismatch as a second viewing angle. In particular, the second pigment can be designed so that the spacing of the orders can be adjusted to fit the first color-shifting pigment design. In this manner, a close spectral match, such as a color match, can be obtained at a predetermined angle regardless of lighting conditions. The pigments used in the security device are high performance pigments.

The first color-shifting pigment can be included with a carrier, such as a solvent or water, to form a first paint or ink. Similarly, the second pigment can be included with a carrier, such as a solvent or water, to form a second paint or ink. Such paint or ink can be applied to a substrate for decorative purposes or as an anti-counterfeiting measure to form a security device. Non-limiting examples of a security device include bank notes, credit cards, stock certificates, software media, and other high-value documents.

The security device can include a substrate. Non-limiting examples of a substrate include paper, glass, polymer (e.g., plastic), metal or combinations thereof. The size and the shape of the substrate can vary depending upon the needs and type of security device.

The substrate can include a region or a plurality of regions, such as a first region and a second region. The first region can be adjacent to the second region. In another aspect, the first region can partially or completely overlap with the second region. The partial or complete overlap can also be formed using the first color-shifting pigment. In an aspect, the first color-shifting pigment can be on the first region of the substrate. The second pigment can be on the second region of the substrate. The first region and the second region can be arranged in such a manner that they create a shape, an image, a symbol, a pattern, a word, etc.

The security device can include a first color-shifting pigment. The first color-shifting pigment can be combined with a carrier, such as a solvent or water, to form a first ink or paint that can color match with the second pigment at a first viewing angle. In an aspect, the first color-shifting pigment can shift color with a change in the viewing angle, such as from a first viewing angle to a second viewing angle. The first color-shifting pigment can color mismatch with the second pigment at a second viewing angle.

The term "color match" as used herein is understood to mean, under the same lighting condition and the same viewing angle, having a minimum perceptible color difference for viewing seamless adjacent pigment pairs of from about 0 to about 2.0 delta E, for example from about 1.5 to about 2.0 delta E. In another aspect, a color match can have a minimum perceptible color difference for viewing a hairline separation between pigment pairs from about 0 to about 5.0 delta E, for example from about 2.0 to about 5.0 delta E. Spectral measurements can be used to determine delta E. The term "color mismatch" as used herein is understood to mean, under the same lighting condition and the same viewing angle, a delta E outside the values above for a seamless separation of pigment pairs and a hairline separation of pigment pairs.

The first color-shifting pigment can include a multi-layered structure, such as a five-layer structure. In an aspect, the first color-shifting pigment can have the following structure: absorber layer/dielectric layer/reflector layer/dielectric layer/absorber layer. In another aspect, the first color-shifting pigment can also include a structure wherein the reflector layer is replaced with a core having the following structure: reflector layer/magnetic layer/reflector layer or reflector layer/magnetic layer. The first color-shifting pigment can include a magnetic layer. Non-limiting examples of the materials that can be present in each of the layers of the multi-layered structure of the first color-shifting pigment are described more fully herein.

The first color-shifting pigment can include a dielectric material that is different from a dielectric material in the second pigment. However, the dielectric material in each of the dielectric layers of the first color-shifting pigment can be the same or different. In an aspect, the first color-shifting pigment can include a dielectric layer with a low refractive index material, such as magnesium fluoride, but can also, or in addition to, include any other low refractive index material disclosed herein. The use of a low refractive index (Lo RI) material can increase the color shift of the first color-shifting pigment.

In another aspect, the first color-shifting pigment can have an optical thickness that is the same or different than an optical thickness of the second pigment. For example, the first color-shifting pigment can have an optical thickness that can be optimized to color match with the second pigment at a first viewing angle. The optical thickness can be smaller than an optical thickness of the second pigment. In this manner, the first color-shifting pigment can color shift faster than the second pigment. For example, when tilting from perpendicular to a higher viewing angle the hue angle of the color at angle of the first color-shifting pigment passes the hue angle of the color at angle of the second pigment.

The security device can also include a second pigment. The second pigment can be combined with a carrier, such as a solvent or water, to form a second ink or paint that can exhibit a first color at a first viewing angle. In an aspect, the second pigment can color match with the first color-shifting pigment at the first viewing angle. In an aspect, the second pigment can exhibit a color shift that is slower than the first color-shifting pigment. In this manner, the second pigment can color mismatch with the first color-shifting pigment at a second viewing angle.

The second pigment can include a multi-layered structure, such as a seven-layer structure. In an aspect, the second pigment can have the following structure: dielectric layer/absorber layer/dielectric layer/reflector layer/dielectric layer/absorber layer/dielectric layer. In another aspect, the second pigment can also include a structure wherein the reflector layer is replaced with a core having the following structure: reflector layer/magnetic layer/reflector layer or reflector layer/magnetic layer. In another aspect, the second pigment can include a magnetic layer. In another aspect, the second pigment can include at least three dielectric layers, such as at least three layers of a high refractive index (Hi RI) material. Non-limiting examples of the materials that can be present in each of the layers of the multi-layered structure of the second pigment are described more fully herein. The addition of more layers can allow more degrees of freedom to tune the reflection spectrum of the second pigment to be similar to the reflection spectrum of the first color-shifting pigment.

The second pigment can include a dielectric material that is different from a dielectric material in the first color-shifting pigment. However, the dielectric material in each of the dielectric layers of the second pigment can be the same or different. In an aspect, the second pigment can include a dielectric layer with a high refractive index material, such as zinc sulfide, but can include any other high refractive index material disclosed herein. The use of a high refractive index material can decrease the color shift of the second pigment.

In another aspect, the second pigment can have an optical thickness that is the same or different than an optical thickness of the first color-shifting pigment. For example, the second pigment can have an optical thickness that can be optimized to color match with the first color-shifting pigment at a first viewing angle. For example, the second pigment can have an optical thickness that is thinner than an optical thickness of the first color-shifting pigment. In this manner, the second pigment color shifts at a rate slower than the first color-shifting pigment.

The multilayered structures of the first and second pigment can be formed from the materials discussed in the following paragraphs. It should be noted that the materials used in each of the first and second pigment can be the same or different, i.e., within each pigment and between each pigment. Additionally, the multilayered structure of each of the first and second pigment can include layers other than those disclosed above so long as the first and second pigment are able to color match at a first viewing angle and color mismatch at a second viewing angle.

The reflector layer can be composed of materials having reflective characteristics suitable for the intended use of the pigment. For example, the reflector material can be aluminum, which has good reflectance characteristics while remaining inexpensive and easy to form into a thin layer. It will be appreciated in view of the teachings herein, however, that other reflector materials can be used in place of aluminum. For example, copper, silver, gold, platinum, palladium, nickel, cobalt, niobium, chromium, tin, titanium, iron, and combinations or alloys of these or other metals can be used as reflective materials. Other useful reflector materials include, but are not limited to, other transition metals as well as lanthanide metals, and combinations thereof. In addition, metal carbides, metal oxides, metal nitrides, metal sulfides, combinations thereof, or mixtures of metals and one or more of these materials can also be used as reflector materials.

The thickness of the reflector layers can be in a range from about 10 nm to about 150 nm, although this range should not be taken as restrictive. For example, the lower limit of about 10 nm is selected for a reflector layer so that the reflector layer can be semi-transparent. As the thickness of the reflector layer is increased, the reflector layer can become more opaque. The upper limit of about 150 nm can be selected primarily to maintain a high aspect ratio of diameter to thickness in the pigment. Even greater thicknesses could be acceptable for some purposes. In another aspect, the thickness of the reflector layer can be from about 60 nm to about 150 nm. With respect to the lower limit of about 60 nm, this limit is selected to obtain a substantially opaque thickness for an aluminum layer for the purpose of facilitating reflectance.

The dielectric layer can be composed of a material having a "low" index of refraction, which is defined herein as an index of refraction of about 1.65 or less. Non-limiting examples of low refractive index materials include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low refractive index material having an index of refraction of about 1.65 or less. For example, organic monomers and polymers can be utilized as low refractive index materials, including dienes or alkenes such as acrylates (e.g., methacrylate), perfluoroalkenes, polytetrafluoroethylene (TEFLON), fluorinated ethylene propylene (FEP), combinations thereof, and the like. The dielectric layer can be formed to have an optical thickness of a plurality of halfwaves at a particular design wavelength, with a physical thickness in a range from about 50 nm to about 800 nm, for example from about 72 nm to about 760 nm, and as a further example from about 200 nm to about 600 nm.

A dielectric layer can be composed of a material having a "high" index of refraction, which is defined herein as an index of refraction of greater than about 1.65. Non-limiting examples of high refractive index materials include zinc sulfide (ZnS), zinc oxide (ZnO), zirconium oxide ($ZrO_2$), titanium dioxide ($TiO_2$), carbon, indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II) diiron (III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like. The dielectric can be formed to have a physical thickness in a range from about 50 nm to about 800 nm, and for example from about 72 nm to about 760 nm.

An absorber layer can include all metals or metal compounds, or other materials, which have uniform absorption or selective absorption in the visible spectrum. Non-limiting examples of such materials include chromium, nickel, iron, titanium, aluminum, tungsten, molybdenum, niobium, carbon, and silicon; sulfides, nitrides, phosphides and oxides of metals; combinations or alloys thereof, such as Inconel (Ni—Cr—Fe); metals mixed in a dielectric matrix; absorbing dielectric materials such as iron oxide (e.g., $Fe_2O_3$), silicon monoxide (SiO), chromium oxide ($Cr_2O_3$), carbon, titanium nitride (TiN), titanium sub-oxide (TiOx, where x is less than 2.0), combinations thereof, and the like; or other substances that are capable of acting as a uniform or selective absorber in the visible spectrum. These absorbing substances can have a ratio of the real component of the refractive index (n) to the imaginary component of the refractive index, the extinction coefficient (k), that satisfies the relationship: $0.1 < n/k < 10$. The absorber layer can be formed to have a physical thickness in a range from about 2 nm to about 80 nm, and for example from about 3 nm to about 30 nm.

As discussed herein, the reflector layer in the multilayer structures of the first color-shifting pigment and the second pigment can be substituted with a core having the following structure: reflector layer/magnetic layer/reflector layer or reflector layer/magnetic layer, wherein the magnetic layer includes magnetic material. The magnetic layer can be used to produce a magnetic color shifting pigment useful in applications such as credit cards, checks, or bar code patterns. For the purposes of this application, "magnetic" materials can be ferro- or ferri-magnetic. Non-limiting examples of material suitable for use in the magnetic layer include nickel, cobalt, iron, gadolinium, terbium, dysprosium, erbium, and their alloys and oxides, Fe/Si, Fe/Ni, Fe/Co, Fe/Ni/Mo, $SmCo_5$, NdCo5, $Sm_2Co_{17}$, $Nd_2Fe_{14}B$, $TbFe_2$, $Fe_3O_4$, $NiFe_2O_4$, and $CoFe_2O_4$, and combinations thereof. It is not necessary that the magnetic layer, or the magnetic material of the magnetic layer, be capable of being permanently magnetized, although it could be.

There is also disclosed a method of making a security device, including applying a first color-shifting pigment to a first region of a substrate; applying a second pigment to a second region, which is adjacent to, or with a partial or complete overlap, the first region, of the substrate to form a security device. The substrate, first color-shifting pigment, second pigment, and security device are as disclosed herein.

There is also disclosed a method of automated authentication of a security device, including spectrally measuring the security device at a first viewing angle; and spectrally measuring the security device at a second viewing angle, wherein a first color-shifting pigment of the security device color matches with a second pigment of the security device at the first viewing angle. The first color-shifting pigment color mismatches with the second pigment at the second viewing angle.

Exemplars produced using the complex coating design achieved the close color match that was tolerant of viewing conditions. This enabled a pattern of one of the vibrant pigments to be printed over the other. At the predetermined viewing angle, the two pigments match and the pattern is invisible. When the sample is tilted, the pattern pops out in an eye catching way. This happens regardless of whether the security article is viewed under incandescent, fluorescent, or day light.

tions; e.g., perfect white light, CIE-D65 (daylight), CIE-A (incandescent lamp) and CIE-F2 (cool white fluorescent light).

FIGS. 1A-1D illustrate the spectral measurement of two pigments at a first viewing angle under 4 different lighting conditions. As can be seen, the spectral measurement results of these two pigments did not match well because the spacing and width of the reflection peaks and valleys in the reflection spectra of these pigments was different Table 1 below provides the delta E value for the first and second pigments under the various lighting conditions.

TABLE 1

| | Illuminant | | | | | | | |
|---|---|---|---|---|---|---|---|---|
| | White | | D65 | | A | | F2 | |
| sample | 4QWOT | 2QWOT | 4QWOT | 2QWOT | 4QWOT | 2QWOT | 4QWOT | 2QWOT |
| L* | 78.13 | 87.34 | 78.59 | 87.53 | 77.03 | 86.88 | 80.18 | 88.45 |
| a* | −49.50 | −28.70 | −55.90 | −36.40 | −30.60 | −7.50 | −40.30 | −22.80 |
| b* | 76.86 | 45.83 | 74.47 | 41.40 | 93.25 | 79.25 | 93.86 | 66.15 |
| C* | 91.42 | 54.07 | 93.12 | 55.13 | 98.14 | 79.60 | 102.15 | 69.97 |
| h | | | | | | | | |
| ΔE*ab | 38.47 | | 39.42 | | 28.75 | | 33.80 | |

The spectral data of Table 1 shows that the two pigments matched for hue but that there were significant differences in lightness and chroma. These differences resulted in a poor color match. A color match for a minimum perceptible color difference for viewing a seamless separation between pigment pairs is from about 0 to about 2.0 delta E, for example from about 1.5 to about 2.0 delta E. Additionally, the minimum perceptible color difference for viewing a hairline separation between pigment pairs is from about 0 to about 5.0 delta E, for example from about 2.0 to about 5.0 delta E.

EXAMPLES

Comparative Example 1

A pair of pigments was formed. A first color-shifting pigment had a structure as follows: absorber layer/dielectric layer/reflector layer/dielectric layer/absorber layer. Each of the dielectric layers within the first color-shifting pigment had an optical thickness of 2 quarter-wave optical thickness (QWOT). A second pigment had the same structure as the first color-shifting pigment; however, each of the dielectric layers had an optical thickness of 4 QWOT. The dielectric material used in the first color-shifting pigment was the same as the dielectric material used in the second pigment. In particular, the dielectric material was a low refractive index material, i.e., MgF$_2$. Both the first color-shifting pigment and the second pigment were color shifting pigments; however, the second pigment color shifted faster than the first color-shifting pigment.

The first color-shifting pigment was applied to a first region of a substrate. The second pigment was applied to a second region, adjacent to the first region, of the substrate to create a security device. The reflectance of the pair of pigments was measured under a variety of lighting conditions; e.g., perfect white light, CIE-D65 (daylight), CIE-A (incandescent lamp) and CIE-F2 (cool white fluorescent light).

Comparative Example 2

A pair of pigments was formed. A first color-shifting pigment had a structure as follows: absorber layer/dielectric layer/reflector layer/dielectric layer/absorber layer. Each of the dielectric layers within the first color-shifting pigment had an optical thickness of 4 QWOT. The dielectric material in the first color-shifting pigment was a high refractive index material (Hi RI), i.e., ZnS, which slowly color shifted. The dielectric material in the second pigment was a low refractive index material (Lo RI), i.e., MgF$_2$, which color shifted faster than the first color-shifting pigment.

The first color-shifting pigment was applied to a first region of a substrate. The second pigment was applied to a second region, adjacent to the first region, of the substrate to create a security device. The reflectance of the pair of pigments was measured under a variety of lighting conditions as in Comparative Example 1.

FIGS. 2A-D illustrate the spectral measurement of two pigments at a first viewing angle under 4 different lighting conditions. As can be seen, the spectral measurement results did not match well because the spacing and width of the reflection peaks and valleys are different. Table 2 below provides the delta E value for the first and second pigments under the various lighting conditions.

Table 2 below provides the delta E value for the first and second pigments under the various lighting conditions.

TABLE 2

| | Illuminant | | | | | | | |
|---|---|---|---|---|---|---|---|---|
| | White | | D65 | | A | | F2 | |
| sample | Lo RI | Hi RI | Lo RI | Hi RI | Lo RI | Hi RI | Lo RI | Hi RI |
| L* | 78.13 | 84.78 | 78.59 | 85.12 | 77.03 | 83.92 | 80.18 | 86.58 |
| a* | −49.50 | −42.80 | −55.90 | −50.50 | −30.60 | −22.20 | −40.30 | −32.90 |
| b* | 76.86 | 69.23 | 74.47 | 68.13 | 93.25 | 94.03 | 93.86 | 91.45 |
| C* | 91.42 | 81.39 | 93.12 | 84.81 | 98.14 | 96.62 | 102.15 | 97.19 |
| h | | | | | | | | |
| ΔE*ab | 12.14 | | 10.58 | | 10.89 | | 10.08 | |

The spectral data of Table 2 shows that the two pigments matched for hue but that there were significant differences in lightness, and chroma. This again resulted in a poor color match. A color match for a minimum perceptible color difference for viewing a seamless separation between pigment pairs is from about 0 to about 2.0 delta E, for example from about 1.5 to about 2.0 delta E. Additionally, the minimum perceptible color difference for viewing a hairline separation between pigment pairs is from about 0 to about 5.0 delta E, for example from about 2.0 to about 5.0 delta E.

Example 1

A pair of pigments was formed. A first color-shifting pigment had a structure as follows: absorber layer/dielectric layer/reflector layer/dielectric layer/absorber layer. The dielectric material used in the first color-shifting pigment was different from the dielectric material used in the second pigment. In particular, the dielectric material in the first color-shifting pigment was a low refractive index material (Lo RI), i.e., $MgF_2$, which shifts color faster than the second pigment. The second pigment had a structure as follows: dielectric layer/absorber layer/dielectric layer/reflector layer/dielectric layer/absorber layer/dielectric layer. The dielectric material in the second pigment was a high refractive index material (Hi RI), i.e., ZnS, which color shifts slower than the first color-shifting pigment. The thickness of the dielectric layers of the second pigment (Hi RI) was optimized to yield color match with the first pigment (Lo RI), such as by using a combination of different optical thicknesses.

The first color-shifting pigment was applied to a first region of a substrate. The second pigment was applied to a second region, adjacent to the first region, of the substrate to create a security device. The reflectance of the pair of pigments was measured under a variety of lighting conditions.

FIGS. 3A-D illustrate the spectral measurement of two pigments at a first viewing angle under 4 different lighting conditions. As can be seen, the first color-shifting pigment and the second pigment color match as evidenced by size and shape of the peaks aligning substantially similarly.

Table 3 below provides the delta E value for the first and second pigments under the various lighting conditions.

TABLE 3

| | Illuminant | | | | | | | |
|---|---|---|---|---|---|---|---|---|
| | White | | D65 | | A | | F2 | |
| sample | Lo RI | Hi RI | Lo RI | Hi RI | Lo RI | Hi RI | Lo RI | Hi RI |
| L* | 78.13 | 78.41 | 78.59 | 78.88 | 77.03 | 77.23 | 80.18 | 80.07 |
| a* | −49.50 | −49.70 | −55.90 | −56.40 | −30.60 | −29.90 | −40.30 | −39.20 |
| b* | 76.86 | 76.11 | 74.47 | 73.96 | 93.25 | 92.52 | 93.86 | 93.30 |
| C* | 91.42 | 90.90 | 93.12 | 93.01 | 98.14 | 97.23 | 102.15 | 101.20 |
| h | | | | | | | | |
| ΔE*ab | 0.83 | | 0.77 | | 1.03 | | 1.24 | |

The spectral data of Table 3 shows that the two pigments matched for hue, lightness, and chroma, resulting in a strong color match. A color match for a minimum perceptible color difference for viewing a seamless separation between pigment pairs is from about 0 to about 2.0 delta E, for example from about 1.5 to about 2.0 delta E. Additionally, the minimum perceptible color difference for viewing a hairline separation between pigment pairs is from about 0 to about 5.0 delta E, for example from about 2.0 to about 5.0 delta E.

Figure 4:
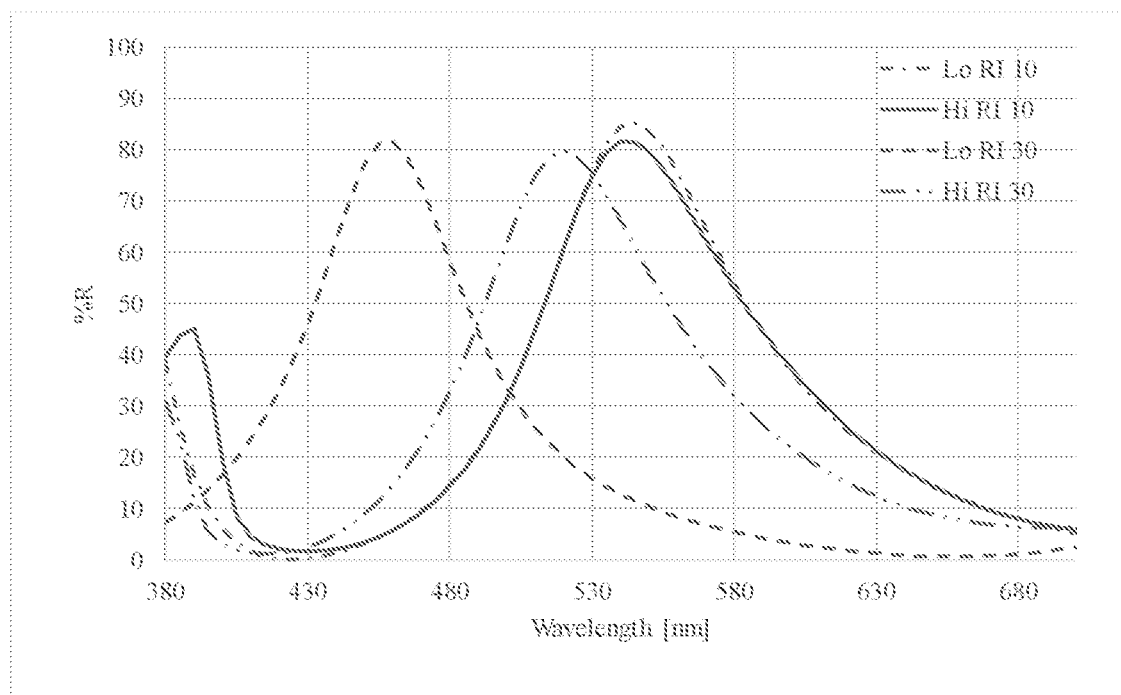
FIG. 4 is a graph of the spectral measurement of the pigments of Example 1 at a change in viewing angle from 10 degrees to 30 degrees.

FIG. 4 illustrates the spectral results of the pigments used in Example 1, but at a change in viewing angle, i.e., from a first viewing angle of 10 degrees to a second viewing angle of 30 degrees. As can be seen, there is a color match at the first viewing angle (the peaks and valleys are aligned and match in width and space), and a color mismatch at the second viewing angle (the peaks and valleys are not aligned).

Table 4 below provides the delta E value for the first and second pigments under perfect white light at a first viewing angle 10 degrees and at a second viewing angle 30 degrees.

TABLE 4

| | Illuminant | | | |
|---|---|---|---|---|
| | White | | White | |
| sample | LO RI 10 | Hi RI 10 | Lo RI 30 | Hi RI 30 |
| L* | 78.13 | 78.41 | 42.32 | 72.98 |
| a* | −49.50 | −49.70 | 10.24 | −68.90 |
| b* | 76.86 | 76.11 | −69.00 | 44.58 |

TABLE 4-continued

| | Illuminant | | | |
| --- | --- | --- | --- | --- |
| | White | | White | |
| sample | LO RI 10 | Hi RI 10 | Lo RI 30 | Hi RI 30 |
| C* | 91.42 | 90.90 | 69.76 | 82.06 |
| h | | | | |
| ΔE*ab | | 0.83 | | 141.79 |

The spectral date in Table 4 illustrates that the first and second pigments exhibit a color match at a first viewing angle (Lo RI10 and Hi RI10), but exhibit a color mismatch at a second viewing angle (Lo RI30 and Hi RI30).

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A security device, comprising:
   a substrate;
   a first color-shifting pigment on a first region of the substrate; and
   a second pigment, including at least three dielectric layers and a reflector layer, on a second region of the substrate;
   wherein the first color-shifting pigment and the second pigment color match at a first viewing angle; and
   wherein the first color-shifting pigment includes a dielectric material that is different from a dielectric material in the second pigment.

2. The security device of claim 1, wherein the first color-shifting pigment includes a five-layer structure.

3. The security device of claim 1, wherein the second pigment includes a seven-layer structure.

4. The security device of claim 1, wherein the first color-shifting pigment includes a dielectric layer with a low refractive index material.

5. The security device of claim 1, wherein the first color-shifting pigment has an optical thickness that is different than an optical thickness of the second pigment.

6. The security device of claim 1, wherein the first color-shifting pigment has an optical thickness that is thicker than an optical thickness of the second pigment.

7. The security device of claim 1, wherein the first color-shifting pigment has the following structure: absorber layer/dielectric layer/reflector layer/dielectric layer/absorber layer.

8. The security device of claim 1, wherein the second pigment has the following structure: dielectric layer/absorber layer/dielectric layer/reflector layer/dielectric layer/absorber layer/dielectric layer.

9. The security device of claim 1, wherein the first color-shifting pigment includes a magnesium fluoride layer.

10. The security device of claim 1, wherein the second pigment includes high refractive index materials in the at least three dielectric layers.

11. The security device of claim 1, wherein the second pigment includes a zinc sulfide layer.

12. The security device of claim 1, wherein the second pigment slowly shifts color with a change in viewing angle.

13. The security device of claim 1, wherein the first color-shifting pigment does shift color with a change in viewing angle.

14. The security device of claim 1, wherein the first color-shifting pigment includes a magnetic layer.

15. The security device of claim 1, wherein the second pigment includes a magnetic layer.

16. The security device of claim 1, wherein the color match includes a minimum perceptible color difference for a seamless separation between the first and second adjacent pigments from about 0 to about 2.0 delta E.

17. The security device of claim 1, wherein the color match includes a minimum perceptible color difference for a hairline separation between the first and second adjacent pigments from about 0 to about 5.0 delta E.

18. A method of automated authentication of a security device, comprising:
   spectrally measuring the security device of claim 1 at a first viewing angle; and
   spectrally measuring the security device at a second viewing angle;
   wherein a first color-shifting pigment of the security device color matches with a second pigment of the security device at the first viewing angle and color mismatches at the second viewing angle.

19. A method of making a security device, comprising:
   applying a first color-shifting pigment to a first region of a substrate;
   applying a second pigment to a second region, which is adjacent to the first region, of the substrate to form a security device; and
   wherein the first color-shifting pigment includes a dielectric material that is different from a dielectric material in the second pigment and the first color-shifting pigment and the second pigment color match at a first viewing angle; and
   wherein the second pigment includes at least three dielectric layers and a reflector layer.

* * * * *